April 17, 1928.  F. ROST  1,666,583

VALVE

Filed Nov. 19, 1924

Inventor
F. Rost

Patented Apr. 17, 1928.

1,666,583

UNITED STATES PATENT OFFICE.

FRIEDRICH ROST, OF KUSNACHT, NEAR ZURICH, SWITZERLAND.

VALVE.

Application filed November 19, 1924, Serial No. 750,939, and in Germany March 25, 1924.

The present invention relates to a new and improved valve and more particularly to a valve to be used as an overflow- and an outlet or draining-off valve in connection with bath tubs, water basins, wash-stands and other liquid receptacles containing dirty and greasy water.

In the valves used for said purpose dirt, grease and sediments are retained by the valves and its parts; and as valves of this type usually require to be taken apart for cleaning, more or less expense and work is necessarily incurred.

The main object of the present invention is to obviate said drawbacks and to provide a valve which not only retains very little dirty matter, grease etc. but which when used removes the adhering dirt, grease which is taken-off by the out flowing water, so that the valve is self-cleaning.

The invention consists of the parts and the construction and combination of parts as hereinafter more fully described and claimed having reference to the accompanying drawings in which—

Figure 1:
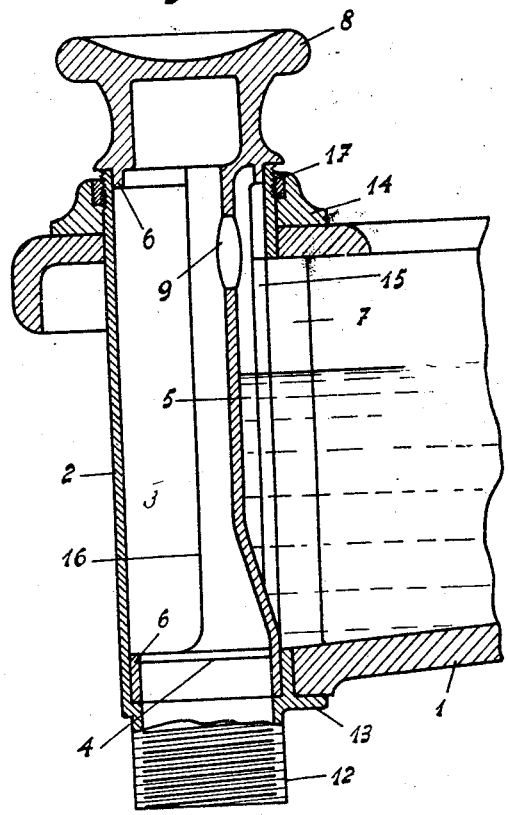
Fig. 1 is a sectional elevation of a valve mounted on a water-basin.
Figure 2:
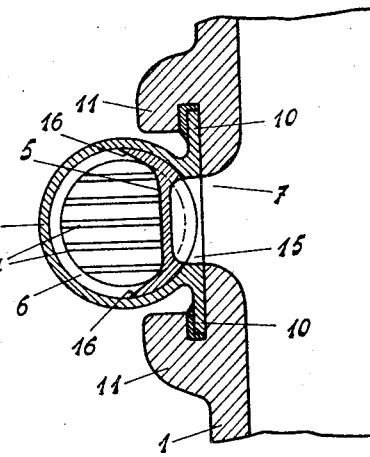
Fig. 2 is a cross-section thereof.

The basin 1 of porcelain or other suitable material is provided with a vertical side wall having a slot 7. On the basin 1 a cylindrical valve casing 2 is rigidly fixed, said valve casing being provided near its lower end with a flange 13 projecting beneath basin 1 and with a nut 14 at its upper end. The nut 14 rests on the upper face of basin 1 and by means of the said nut 14, the casing 2 is clamped on to basin. The casing 2 is moreover provided with a screw threaded socket at its lower end and with flanges 10, 10 projecting laterally into recesses formed in parallel ridges 11 of the vertical side wall of the basin. The flanges 10 are held in said recesses by cement or other suitable jointing material. The cylindrical casing 2 is provided with a slot 15 corresponding in its dimensions to that of slot 7. The valve body is rotatably mounted in the casing 2 and comprises two hollow cylindrical end portions 6, 6 which have a snug rotative fit in the casing bore. The end portions 6, 6 are interconnected by a partition wall 3 having an opening 9 at its upper end below the upper edge of the basin 1. To the upper end portion 6 a handle 8 is rigidly fixed by means of which the valve body may be operated. The lower end portion 6 of the valve body is provided with a grid 4 which retains the coarser impurities, sediments etc. and prevents the clogging of the socket 12 etc. The partition wall 3 is provided with two sharp edges 16 which scrape the inner wall of the casing 2 when the body is turned by its handle 8. The water running through the casing from the basin 1 to the socket 12 takes off the grease etc. To clean the grid the valve body 3, 6 may be lifted by the handle, the cleaning of all the parts may be effected without unfastening the casing 2.

In the position of the parts shown the slot 7 of the basin 1 is closed by the wall 3 and water overflow at 9. To empty the basin the valve body is rotated for about 180° the water passes now through the grid 4. The grid 4 and the handle 8 may be made in one with the valve body or may be made separate thereof and fixed thereto in any suitable manner.

The valve is neat in appearance and is easily cleaned by inexperienced persons and takes but very little room. The materials and finish of the several parts of the valve may be such as experience and judgment of the manufacturer may dictate.

I wish it understood that various changes in form, proportions and minor details of construction may be resorted to within the scope of the appended claims, and I do not wish to limit myself to the specific design and construction here shown.

What I claim and wish to secure by U. S. Letters Patent is:—

1. In combination with a container formed with an elongated outlet, of a casing of cylindrical form slidably cooperating with the container beyond the outlet, means on the casing to limit the upward movement of said casing relative to the container, removable means at the upper end of the casing for cooperation with the container to secure said container in fixed relation with the casing, said container having an elongated opening to align with the outlet of the container when the casing is in position, and a valve body rotatably mounted in the container and comprising upper and lower cylindrical sections to snugly fit within the casing above and below the outlet opening from the container, the wall of the valve body between said sections being cut away for approximately one-half its circumferential length, the remaining portion of the valve body between said sections including a part parallel to the diameter of the valve body and of a width corresponding to that of the container outlet to close said outlet in an appropriate position of the valve body.

2. In combination with a container formed with an elongated outlet, of a casing of cylindrical form slidably cooperating with the container beyond the outlet, means on the casing to limit the upward movement of said casing relative to the container, removable means at the upper end of the casing for cooperation with the container to secure said container in fixed relation with the casing, said container having an elongated opening to align with the outlet of the container when the casing is in position, and a valve body rotatably mounted in the container and comprising upper and lower cylindrical sections to snugly fit within the casing above and below the outlet opening from the container, the wall of the valve body between said sections being cut away for approximately one-half its circumferential length, the remaining portion of the valve body between said sections including a part parallel to the diameter of the valve body and of a width corresponding to that of the container outlet to close said outlet in an appropriate position of the valve body, the free edges of the valve body beyond the closing portion being sharpened to act as scrapers against the wall of the casing in the rotation of the valve body.

In witness whereof I affix my signature.

FRIEDRICH ROST.